United States Patent [19]

Hanning

[11] Patent Number: 4,736,523
[45] Date of Patent: Apr. 12, 1988

[54] SAW GUIDE AND GAUGE

[76] Inventor: James Hanning, 7 Spruce Cir., Andover, Mass. 01810

[21] Appl. No.: 31,798

[22] Filed: Mar. 30, 1987

[51] Int. Cl.$^4$ .............................................. B43L 13/02
[52] U.S. Cl. ............................................ 33/42; 30/294; 83/745; 269/1
[58] Field of Search .................. 30/371, 374, 289, 294; 33/41.1 R, 42; 83/745; 269/1

[56] References Cited

U.S. PATENT DOCUMENTS 4,131,048 12/1978 Dilkes .................................. 83/745

Primary Examiner—Douglas D. Watts
Attorney, Agent, or Firm—John P. McGonagle

[57] ABSTRACT

A device for guiding and gauging a hand-held power saw during crosscut operations on a workpiece. The device is comprised of a guide section and a gauge section interconnected by means of a length of wood strapping. The guide section has a sheath-like structure mounted on a rectangular plate with an upwardly directed forward flange and a downwardly directed side flange. The forward end of the wood strapping terminates in the guide's sheath-like structure. The forward flange guides the power saw across the front of the device. The side flange positions the device on the workpiece. The gauge section also has a sheath-like structure mounted on a square metal plate with a downwardly directed user side flange and a downwardly directed rear flange. The wood strapping passes through the gauge's sheath-like structure and is fixedly attached thereto. The flanges hold the device in position on and at one end of the workpiece.

8 Claims, 3 Drawing Sheets

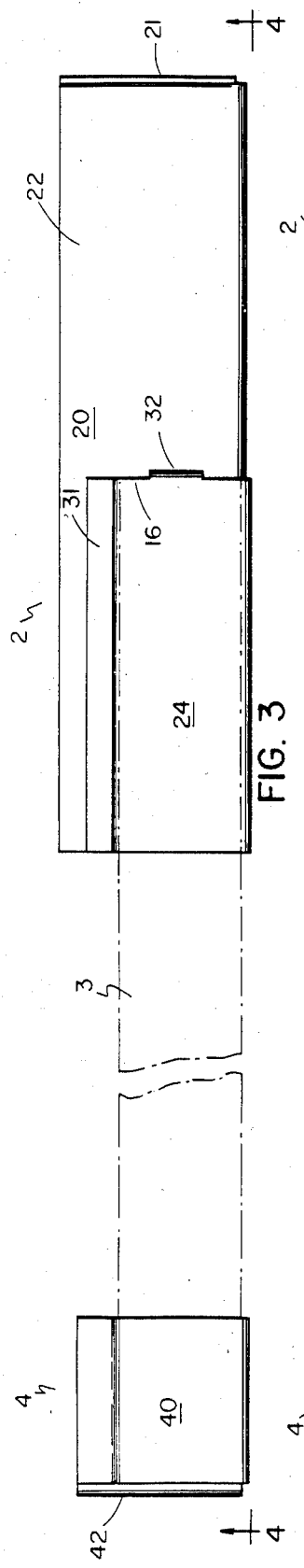
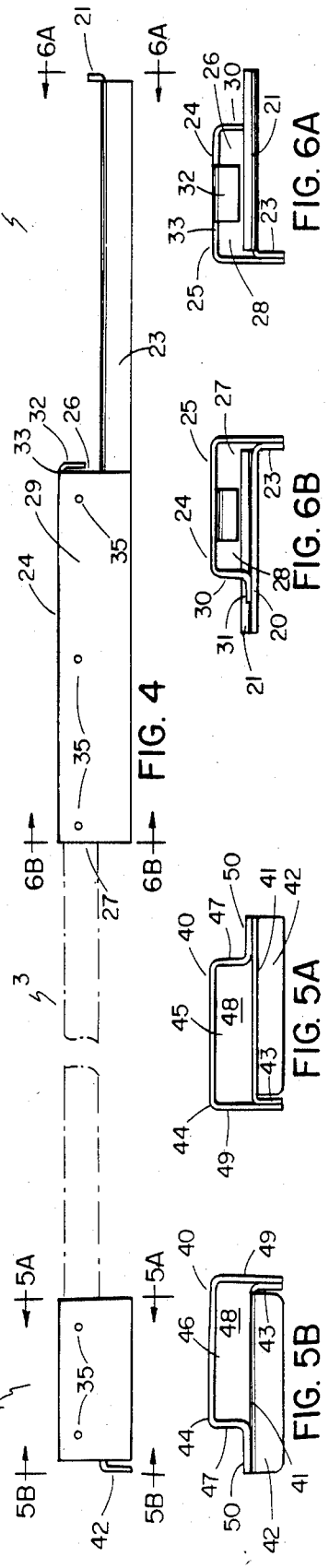
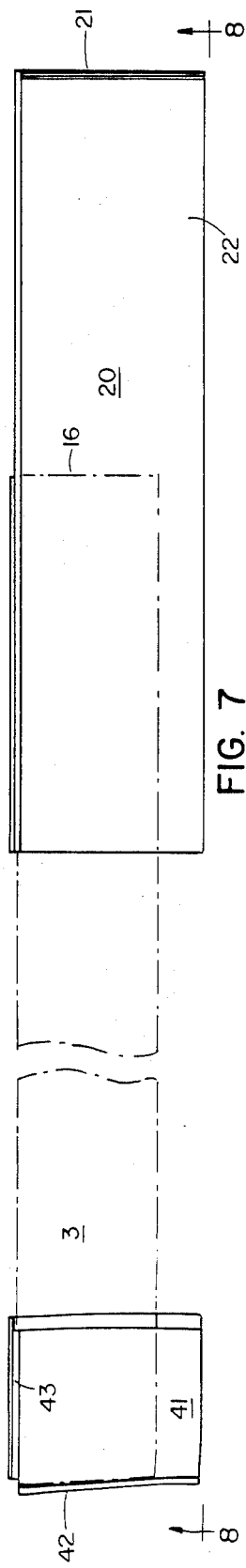
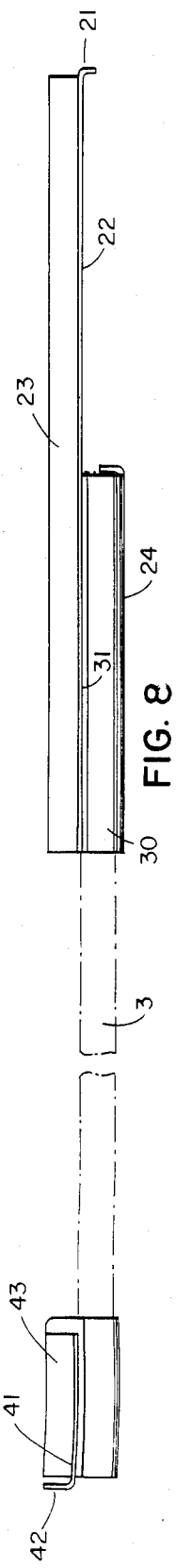

SAW GUIDE AND GAUGE

BACKGROUND OF THE INVENTION

This invention relates to portable, power-driven, cutting tool guides and gauges, and more particularly to a power saw guide and gauge for crosscut operations on wooden boards and planks.

A very large percentage of cuts with a hand power saw in construction work involve cutting boards and planks to proper length with a square, crosscut. The cuts are generally repetitious in that many boards or planks must be cut to the same length.

A problem typically encountered with many available portable cutting tool guides is their need for mechanical clamping devices. Such devices often are not suitable because they are cumbersome and require excessive amounts of time to set up, thereby reducing the saw user's efficiency. Those guides that do not require clamping devices usually do not have a gauge for determining board length, and a separate length measuring operation must take place before a crosscut is made, thereby reducing the saw user's efficiency.

The few guides which combine a gauge means, usually lack the ruggedness needed for outdoor construction work and are more readily applicable to indoor or occasional use. None lend themselves to quick and repetitious use.

SUMMARY OF THE INVENTION

The present invention is a combined guide and gauge designed primarily for crosscut operations with a portable, hand-held, power saw having a circular blade. The invention is comprised of two sections, interconnected by means of a piece of wood strapping. One section comprises a saw guide with means for attachment to the strapping. This section guides the power saw across a generally elongated piece of wood, i.e., board, plank, log, etc. The other section comprises a gauge with means for attachment to the strapping and means for holding the invention to one end of the workpiece being cut. The invention is designed to lay on top of the workpiece being cut. The general lightness of the invention and the stiffness of the strapping permit the user to manipulate the invention with one hand and quickly and efficiently crosscut a number of workpieces to a certain length. The invention is relatively simple and very rugged. It is also light, easy to use, and very accurate over repeated cutting operations.

BRIEF DESCRIPTION OF THE DRAWINGS

FIG. 3 is a top plan view of the invention;

FIG. 4 is a side sectional view taken along section 4—4 of FIG. 3;

FIGS. 5A and 5B are front and rear views of the invention's gauge section taken along sections 5A—5A and 5B—5B, respectively, of FIG. 4;

FIGS. 6A and 6B are front and rear views of the invention's guide section taken along sections 6A—6A and 6B—6B, respectively, of FIG. 4;

FIG. 7 is a bottom plan view of the invention; and

FIG. 8 is a sectional side view taken along section 8—8 of FIG. 7.

DETAILED DESCRIPTION OF THE INVENTION

Figure 1:
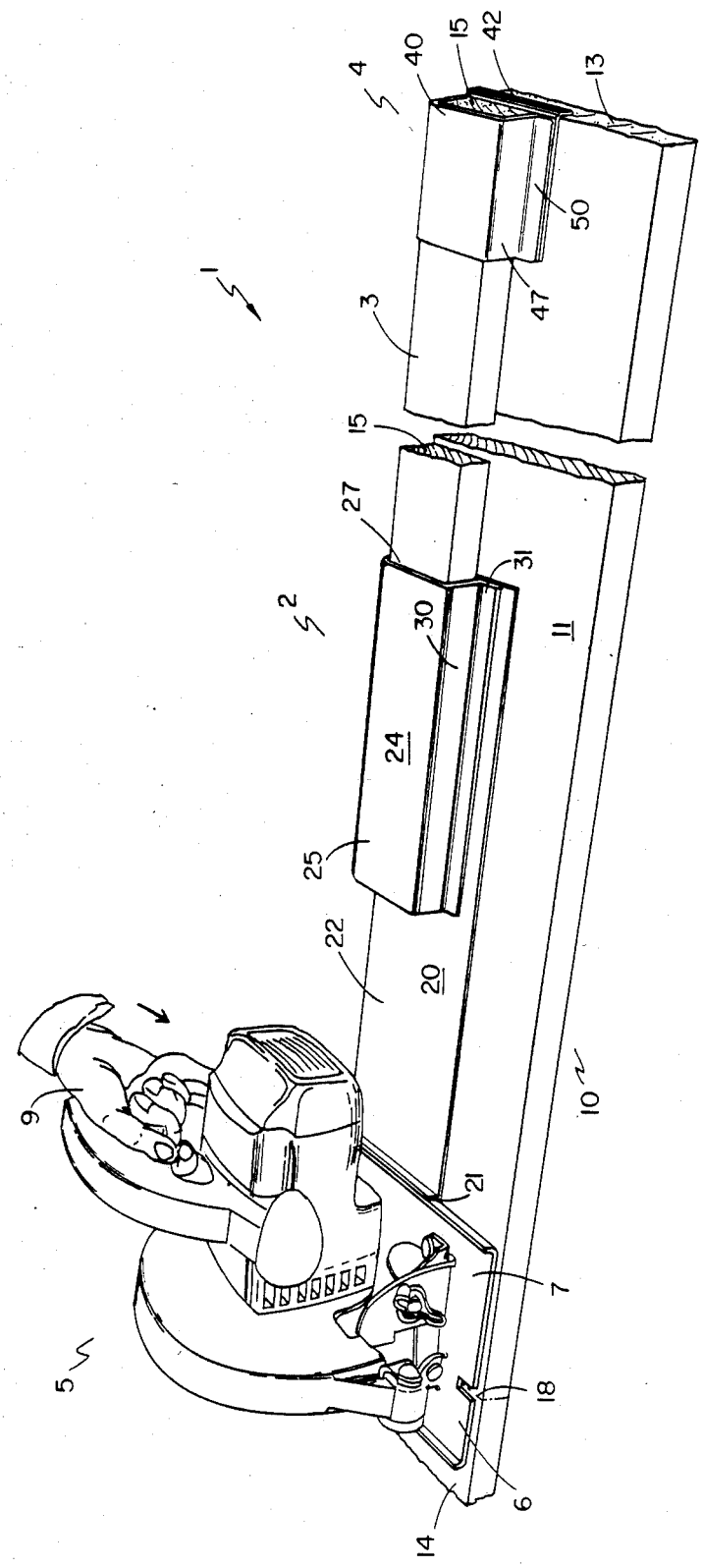
FIG. 1 is a general side, perspective view of the Saw Guide and Gauge mounted on a workpiece being cut by a hand power saw.
Figure 2:
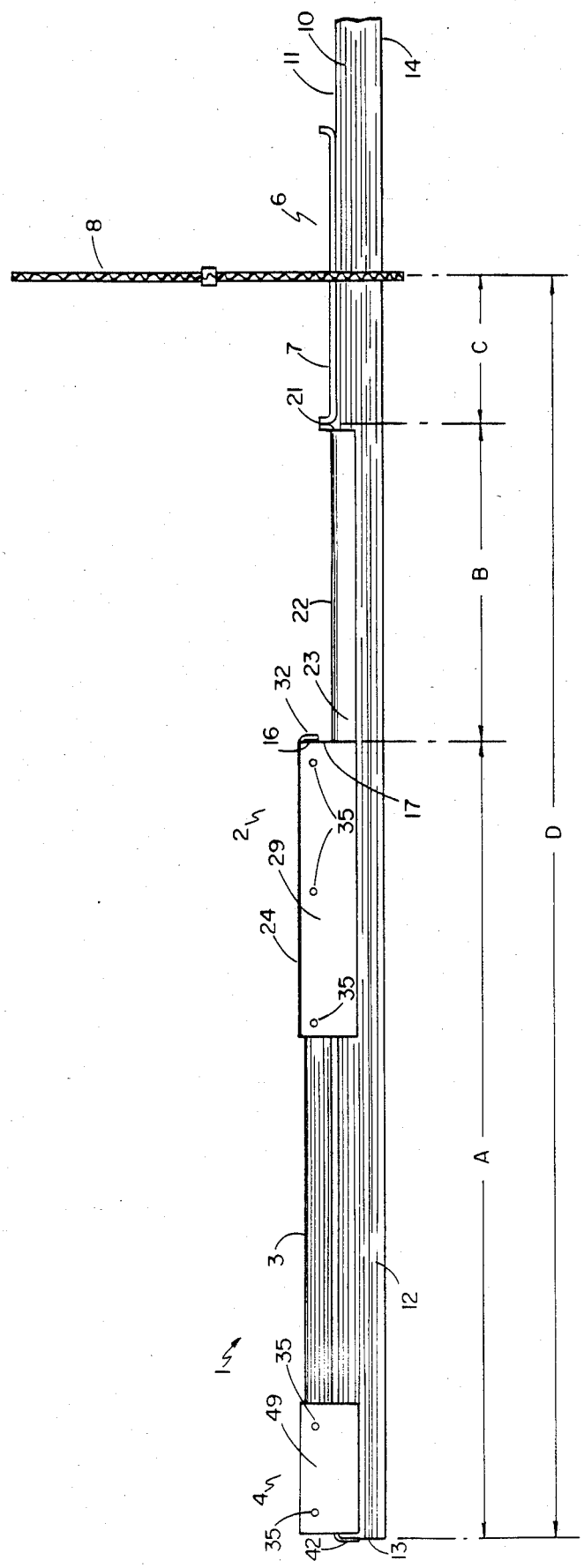
FIG. 2 is an opposite side, plan view of the invention illustrated in FIG. 1.

Referring more particularly to the drawings wherein like numerals indicate like elements, reference numeral 1 refers generally to the saw guids and gauge comprising the present invention; reference numeral 2 refers generally to the guide section of the invention 1; reference numeral 3 refers generally to an elongated piece of wood strapping; and reference numeral 4 refers generally to the gauge section of the invention 1. FIGS. 1 and 2, which illustrate side and opposite side views of the invention 1, show the gauge section 4 holding the invention 1 in position on the face 11 of a board 10, the workpiece in this illustration, being cut by a hand power saw 5. The gauge section 4 is interconnected along, but separate from, the workpiece face 11 to the guide section 2 by means of an elongated piece of wood strapping 3. The power saw base plate 6 abuts the forward edge 21 of the guide section 2. The power saw 5 crosscuts the workpiece along a line 18 parallel to the guide section's forward edge 21. The workpiece length D after the crosscut is equal to the length A from the gauge section's rear flange 42 along the length of wood strapping 3 to the guide section's blocking flange 32, plus the length B of the forward portion 22 of the guide section 2, plus the width C of that portion 7 of the power saw base plate 6 to the user's left of the power saw blade 8. For various desired workpiece lengths D, different lengths of the strapping 3 may be used, or the gauge section 4 may be moved along and fastened at various positions along the strapping 3.

Referring to the remaining drawings as well as FIGS. 1 and 2, the gauge section 4 is comprised of a first, generally flat, square metal gauge member 41 with two, downwardly directed flanges, one 42 to the rear and one 43 to the side. The two flanges 42 and 43 form a right, horizontal angle, and hold the invention 1 in place to the rear edge 13 and along the user side 12 of the workpiece 10. Mounted onto the first gauge member 41 is a second metal gauge member 44 forming an open-ended, sheath-like structure 40, with rectangularly-shaped front 45 and rear 46 openings, and a longitudinal axis coincident with a portion of the longitudinal axis of the invention 1. The open cross-section 48 of the structure 47 is approximately equal to the cross-section 15 of the strapping 3. The structure's vertical wall 49 on the user side 12 extends downwardly over the first member's side flange 43, and is welded to said flange 43. The structure's opposite side vertical wall 47 has a right angle flange 50 formed outwardly at its bottom, which flange 50 forms a face-to-face relationship with a portion of the first member 41 and is welded in place to it 41. The structure's user-side, vertical wall 49 has two nail openings 35. When the invention 1 is used, a length of wood strapping 3 is inserted into the structure 40. Double-headed nails, or other types of fasteners which are readily removable, are externally inserted through the openings 35 firmly fastening the entire gauge section 4 to the strapping 3.

The guide section 2 is comprised of a first, generally flat, rectangular, metal, guide member 20 with two flanges, one 21 forward and one 23 to the side. The longitudinal axis of the first guide member 20 is coincident with a portion of the longitudinal axis of the invention 1. The forward flange 21 is formed at the first guide member's front and is upwardly directed at right angle to the first guide member 20 and runs across the width of the first guide member 20. The forward flange 21 is the forward edge of the invention to which the power saw's base plate 6 abuts for a square crosscut. The side flange 23 is downwardly directed at right angle to the first guide member 20 along the length of the user side of the first guide member 20. Mounted onto and toward the rear of the first guide member 20 is a second guide member 24 forming an elongated, open-ended, sheath-like structure 25, with rectangularly-shaped front 26 and rear 27 openings, and a longitudinal axis parallel with the longitudinal axis of the first guide member 20. The open cross-section of the structure 25 is approximately equal to the strapping cross-section 15. The structure's vertical wall 29 on the user side of the invention 1 extends downwardly over the first guide member's side flange 23, and is welded to said flange 23. The structure's opposite side vertical wall 30 has a right angle flange 31 formed outwardly at its bottom, which flange 31 forms a face-to-face relationship with a portion of the first guide member 20 and is welded in place to it 20. The structure's forward opening 26 is partially blocked by a blocking flange 32 extending vertically downward from that portion of the second guide member 24 forming the top edge 33 of the structure's front opening 26. The structure's user side vertical wall 29 has three nail openings 35. When the invention 1 is used, a length of wood strapping 3 is inserted through the structure's rear opening 27. Fasteners, preferably double-headed nails, are then inserted through the nail openings 35 fixedly attaching the guide section 2 to the strapping 3.

In use, the desired length D of the workpiece 10 is determined. The effective length A may be varied by sliding the gauge section 4 forward along the strapping 3. The strapping 3 is then fixed within the gauge structure 40 and the guide structure 25, and the guide front 21 set appropriately. The user then holds the power saw 5 in one hand and the interconnecting strapping 3, with guide 2 and gauge 4 sections attached, in his other hand. By simple manipulation of the invention 1 the user may cut a stack of boards or planks quickly and easily to exact lengths. The side flanges 23 and 43 enable the user to push the cut workpiece 10 off of the stack and begin cutting the next workpiece 10.

It is understood that the above described embodiment is merely illustrative of the application. Although the above described embodiment was designed primarily for hand-held, power saws having a circular blade, the invention 1 could be equally well used for saws having a reciprocating blade. The invention 1 described above was also designed for right-handed users. However, with minor modifications, it could easily be used by left-handed users. Other embodiments, therefore, may be readily devised by those skilled in the art which will embody the principles of the invention and fall within the spirit and scope thereof.

I claim:

1. A device for guiding and gauging a handheld power saw during crosscut operations on a workpiece, comprising:
    a guide section comprised of a flat, generally rectangular, plate-like member with forward and rear portions, and with a longitudinal axis parallel to the longitudinal axis of the said device, and an elongated, sheath-like member, with two open ends, having a rectangularly shaped open cross-section, mounted on the rear portion of said plate-like member;
    a gauge section; and
    a length of wood strapping with a generally rectangularly shaped cross-section, approximately equal to the cross-section of said sheath-like member, for stiffly interconnecting said guide section with said gauge section, and having a longitudinal axis generally coincident with the longitudinal axis of said sheath-like member and parallel to said plate-like member, wherein the longitudinal axis of said wood strapping is coincident with the longitudinal axis of said device.

2. A device as recited in claim 1, wherein:
    the forward edge of said guide section's plate-like member is formed into an upwardly directed flange for guiding the said hand-held power saw across the front of the device.

3. A device as recited in claim 2, wherein:
    the long edge of said guide section's plate-like member nearest to the device user is formed into a downwardly directed flange for holding the guide section in position on the workpiece.

4. A device as recited in claim 3, wherein:
    the guide section's sheath-like member has a flange downwardly projecting from the top of its forward open end.

5. A device as recited in claim 4, wherein:
    the guide section's sheath-like member has a plurality of fastener openings along its side length for fixedly attaching a portion of the wood strapping within said sheath-like member.

6. A device as recited in claim 5 wherein the gauge section is comprised of:
    a flat, generally square, plate-like member with forward, rear and side edges, one side edge of which is nearest to the device user; and
    a moderately elongated, sheath-like member with two open ends, having a rectangularly shaped open cross-section approximately equal to the cross-section of the said wood strapping, mounted on said gauge plate-like member adjacent the user side edge, and having a longitudinal axis coincident with the longitudinal axis of said wood strapping.

7. A device as recited in claim 6, wherein:
    the gauge section's plate-like member's rear and user side edges are formed into downwardly directed flanges for holding the gauge section in position on and at one end of the workpiece.

8. A device as recited in claim 7, wherein:
    the gauge section's sheath-like member has a plurality of fastener openings along its side length for fixedly attaching the gauge section to the wood strapping.

* * * * *